United States Patent [19]

Poe

[11] Patent Number: 4,779,484
[45] Date of Patent: Oct. 25, 1988

[54] COVER ASSEMBLY FOR ROTATING MACHINE SHAFTS

[75] Inventor: Jimmie R. Poe, Hamilton, Ohio

[73] Assignee: Champion International Corporation, Stamford, Conn.

[21] Appl. No.: 839,925

[22] Filed: Mar. 17, 1986

[51] Int. Cl.$^4$ ............................................. F16P 1/00
[52] U.S. Cl. .......................................... 74/608; 74/609
[58] Field of Search .................. 74/608, 609, 612; 403/23, 348, 335, 353, 7; 248/222.3, 312, 312.1; 464/171, 172, 170, 177

[56] References Cited

U.S. PATENT DOCUMENTS

| | | | |
|---|---|---|---|
| 1,166,722 | 1/1916 | Stanley | 403/23 X |
| 1,387,553 | 8/1921 | Miller | 74/612 |
| 1,464,794 | 8/1923 | Withrow et al. | 74/609 X |
| 1,510,094 | 9/1924 | Dannelley | 464/170 X |
| 1,686,861 | 10/1928 | Kesler | 74/609 |
| 2,141,027 | 12/1938 | Wiesman | 74/612 |
| 2,283,974 | 5/1942 | Dillon | 403/335 X |
| 2,410,503 | 11/1946 | Johnson | 74/612 |
| 2,602,493 | 7/1952 | Burdick | 403/7 |
| 3,165,273 | 1/1965 | Fahrbach | 464/177 X |
| 3,734,243 | 5/1973 | Girauldon | 403/348 X |
| 4,201,935 | 5/1980 | Fukuma et al. | 74/609 X |
| 4,324,533 | 4/1982 | Schroeder et al. | 403/23 X |

FOREIGN PATENT DOCUMENTS

| | | | |
|---|---|---|---|
| 2733990 | 2/1979 | Fed. Rep. of Germany | 74/612 |
| 154821 | 12/1920 | United Kingdom | 464/170 |
| 442313 | 2/1936 | United Kingdom | 74/609 |

Primary Examiner—Gary L. Smith
Assistant Examiner—Rodney M. Lindsey
Attorney, Agent, or Firm—Evelyn M. Sommer

[57] ABSTRACT

The exposed end of a rotating shaft of a machine is covered with a protective cover which affords a measure of safety for those working around the machine. The cover can be quickly mounted on or removed from the machine without the need of any special tools or the like. The cover is of simple, sturdy construction.

3 Claims, 2 Drawing Sheets

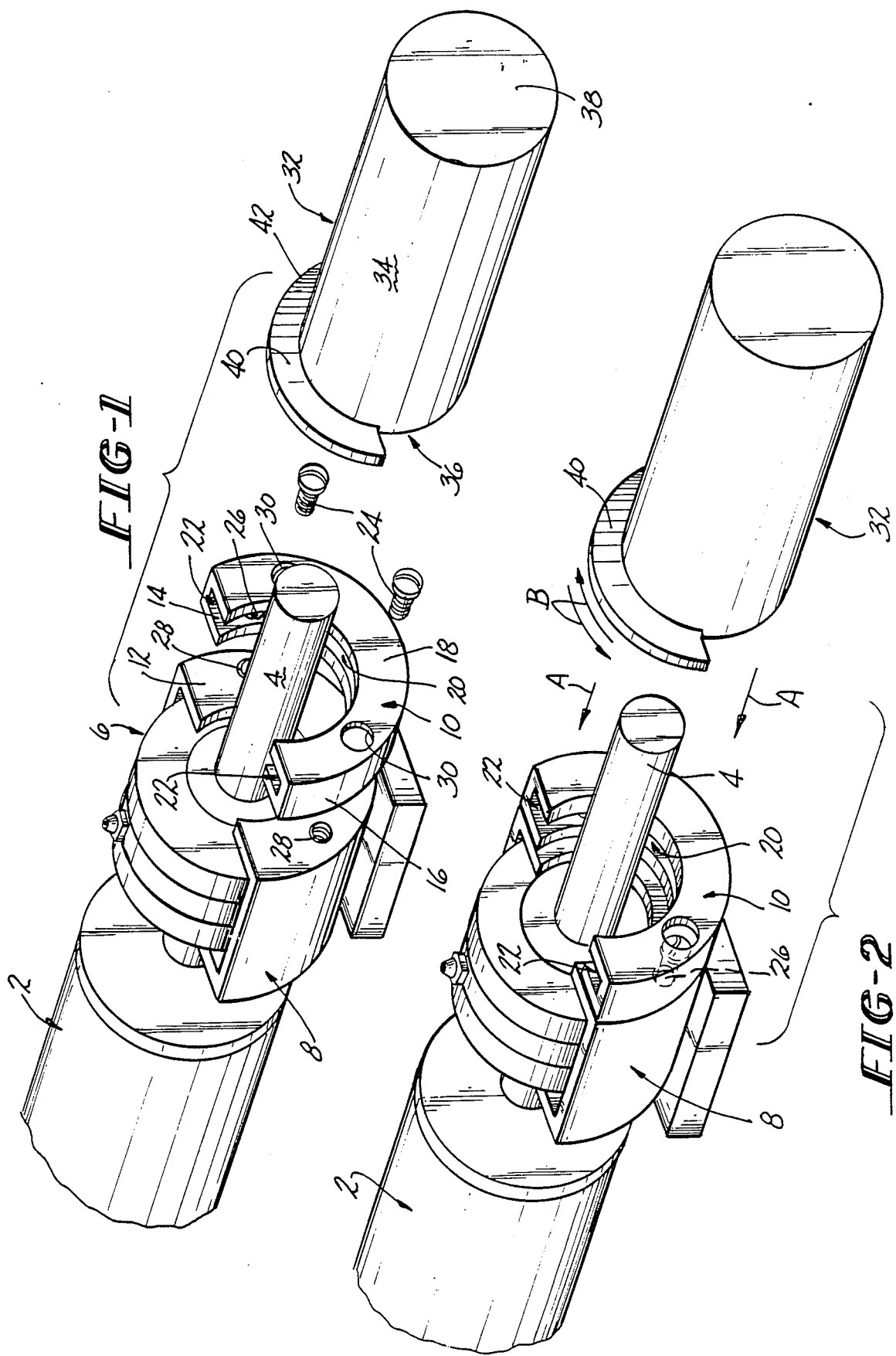

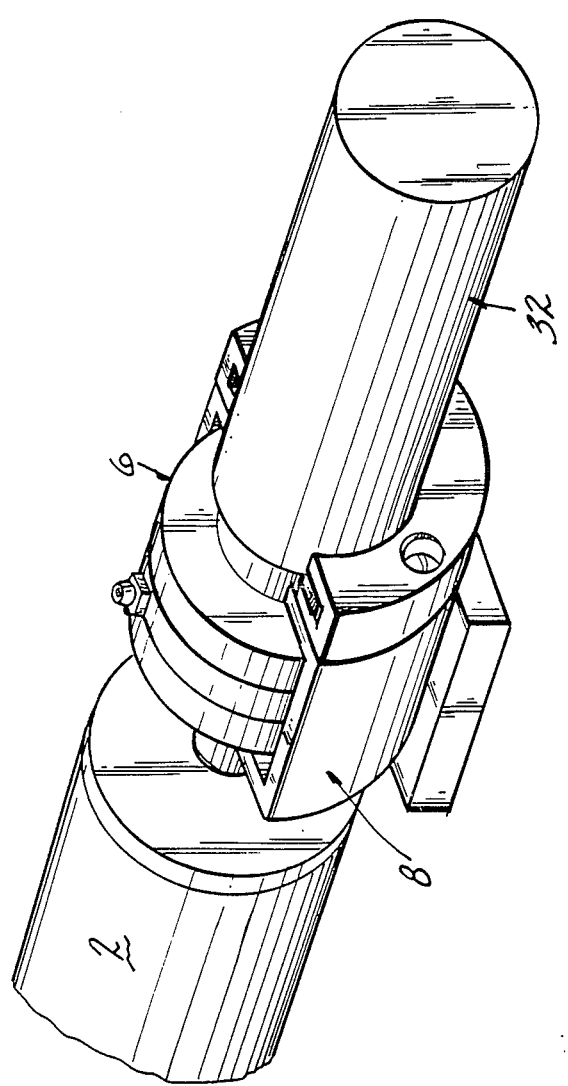
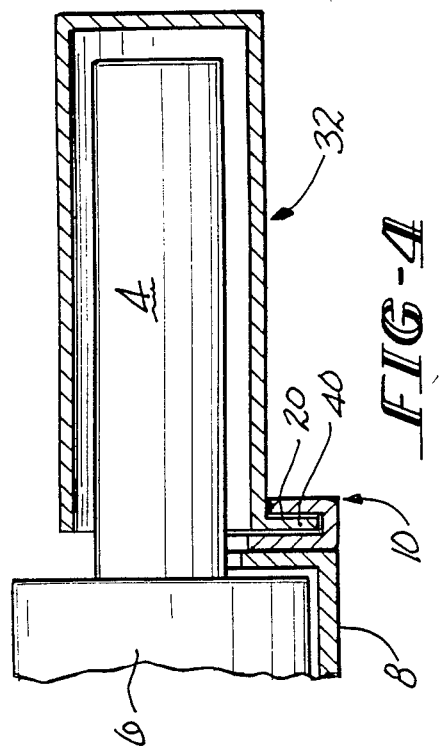

COVER ASSEMBLY FOR ROTATING MACHINE SHAFTS

This invention relates to a safety cover for exposed ends of rotating machine shafts, and more particularly, to a safety cover which can be quickly and easily connected to or disconnected from the machine in question.

Machines which have journaled rotating shafts may operate with the ends of the rotating shafts exposed, the shafts being journaled on bearings which are inboard of the shaft ends. An example of such an arrangement is the felt rolls in a paper making machine. The felt rolls are paper sheet stock transferring rolls which are located in the drying section of the paper making machine. It is noted that these exposed rotating shaft ends present a hazard to those working around them, and that they must be covered to alleviate the problem. The covers which are presently in use are cylindrical in shape with a closed bottom wall. The opposite end of the cover is open to allow the cover to be telescoped over the shaft end. A flange extends radially outwardly of the cover at the open end and is provided with a plurality of holes to allow the cover to be bolted or screwed to the adjacent bearing housing. This cover is acceptably functional, but requires time and special tools to remove from and attach to the machine.

The cover of this invention is as acceptably functional as the aforesaid cover, but can be connected to, and disconnected from, the bearing housing in a matter of seconds without the use of any tools. The cover of this invention is of cylindrical configuration with an outer closed end. The inner end is open to telescope over the shaft. The radial flange is provided at the inner end and extends circumferentially for about 180° of the circumference of the cover. A mounting bracket is secured to the bearing housing below the rotating shaft. The bracket has a U-shaped cross-sectional configuration and extends through about a 180° arc below the shaft. Openings are provided in the front wall of the bracket at spaced locations to allow access to smaller openings in the back wall of the bracket whereby the bracket can be bolted or screwed onto the bearing housing. The bolts or screws are flush with the back wall of the bracket so that the channel formed by the U-shape of the bracket is not blocked by any fasteners. The ends of the channel in the bracket are both open. The cover is mounted in place by telescoping it over the shaft with the flange being positioned above the shaft on the opposite side thereof from the bracket. The cover is then rotated about its axis 180° to slide the flange into the channel in the bracket via one of the open ends of the channel. The cover will then be held in place on the bearing housing covering the shaft. To remove the cover, the latter is merely once more rotated about its axis 180° to slide the flange out of the bracket channel so that the cover can be pulled away from the shaft.

It is, therefore, an object of this invention to provide a protective cover for a rotating shaft end which protects against personal injury which could be caused by contact with the rotating shaft end.

It is a further object of this invention to provide a cover of the character described which can be easily and quickly mounted in and dismounted from its operative position.

It is another object of this invention to provide a cover of the character described which can be used without requiring any tools.

It is an additional object of this invention to provide a cover of the character described which is of simple yet rugged construction.

These and other objects and advantages of the invention will become more readily apparent from the following detailed description of a preferred embodiment thereof when taken in conjunction with the accompanying drawings, in which:

FIG. 1 is an exploded perspective view, partially fragmented, of the shaft, bearing, and cover assembly;

FIG. 2 is an exploded perspective view similar to FIG. 1 but showing the mounting bracket fixed to the bearing housing;

FIG. 3 is a fragmented perspective view similar to FIGS. 1 and 2 but showing the cover mounted in place; and FIG. 4 is an axial sectional view showing the mode of engagement between the cover and the mounting bracket.

Referring now to the drawings, there is shown in FIG. 1 a preferred embodiment of a shaft cover formed in accordance with this invention. The particular machine that the cover is utilized with is a paper making felt roll 2 which rotates with a shaft 4. The shaft 4 is journaled in a bearing 6 which is housed in a bearing holder 8. A U-shaped bracket 10 is adapted to be secured to the front wall 12 of the bearing holder 8. The bracket 10 has a back wall 14, and outer side wall 16 and a front wall 18. The walls 14, 16 and 18 are operable to form a channel 20 which opens upwardly and which has open ends 22. The bracket 10 is removably secured to the bearing holder 8 by a pair of screws 24 which extend through openings 26 in the back wall 14 of the bracket 10 and screw into threaded openings 28 in the front wall 12 of the bearing holder 8. Enlarged openings 30, aligned with the openings 26, are formed in the front wall 18 of the bracket 10 to allow positioning of the screws 24 and to allow access for a screwdriver or the like to tighten and loosen the screws 24 in the openings 28. The cover 32 includes a cylindrical side wall 34 and has an open end 36 and a closed end 38. At the edge of the side wall 34 defining the open end 36, there is formed a radially outwardly extending flange 40. The flange 40 has an outward curvilinear edge 42 and extends through approximately 180° of the circumference of the side wall 34.

In FIG. 2, the bracket 10 is shown secured to the bearing holder 8, and the cover 32 is shown as positioned preparatory to mounting in place over the shaft 4. Covering of the shaft 4 is accomplished by moving the cover 32 in the direction of the arrows A until the flange 40 is aligned with the channel 20. The cover is then rotated about its axis 180° in the direction of either arrow B to cause the flange 40 to enter the channel 20 via the two open ends 22 thereof. The resulting connection is shown in FIG. 3. Since there are two open ends 22 there is at least one open end 22.

As seen in FIG. 4, the flange 40 nests snugly in the channel 20 of the bracket 10 so that the cover 32 is held firmly in place over the rotating shaft 4. It will be noted that the screws 24, being flush against the back wall 14 of the bracket 10, do not interfere with manipulation of the cover 32, and it will also be noted that the cover 32 can be quickly mounted in place and also can be quickly dismounted.

It will be readily appreciated that the cover assembly of this invention is durable and of simple construction, and can be quickly and easily mounted and dismounted from its operable position. It provides full protection and yet allows quick and easy inspections and servicing of the bearings and shafts with which it is associated.

Since many changes and variations of the disclosed embodiment of the invention may be made without departing from the inventive concept, it is not intended to limit the invention otherwise than as required by the appended claims.

What is claimed is:

1. A cover assembly for protectively covering an exposed rotating machine shaft wherein the shaft prodrudes from a bearing assembly contained in a bearing housing, said cover assembly comprising:

(a) a U-shaped bracket comprising a back wall secured to a face of said bearing housing which is perpendicular to the axis of said machine shaft, said bracket further having a front wall spaced from and parallel to said back wall, said front and back walls being joined by an outer side wall, such that said front, back and side walls define a channel which opens in the direction of said machine shaft, said bracket being disposed below and opening up toward said machine shaft so that said channel extends through approximately a 180° arc about said machine shaft, said channel being free of obstructions intermediate said front and back walls, said bracket defining at least one open end leading to said channel; and (b) a cover having a cylindrical configuration with a first closed end and a second open end, said cover having a radial flange disposed at said open end and extending therefrom at right angles to the axis of said cover, said flange extending through approximately a 180° arc about the axis of said cover and being dimensioned to fit in the channel of the U-shaped bracket, said cover being removably mountable in said bracket by aligning said flange axially with said bracket channel and rotating said cover about its axis to cause said flange to enter the substantially obstruction free channel of the U-shaped bracket through the open end thereof in which position said cover overlies and is substantially coaxial with said machine shaft.

2. The cover assembly of claim 1 wherein said bracket is releasably fastened to said bearing housing by screws extending through said back wall of said bracket, said screws having heads substantially flush with said back wall so as not to impede movement of said flange into and out of said bracket channel, and said front wall of said bracket is provided with openings aligned with said screws to allow manipulation of the latter with a suitable tool.

3. The cover assembly of claim 1 wherein both ends of said bracket channel are open.

* * * * *